(12) United States Patent
Bitton et al.

(10) Patent No.: US 11,563,762 B2
(45) Date of Patent: Jan. 24, 2023

(54) USER FLOW GRAPH ANALYTICS FOR CYBER SECURITY

(71) Applicant: INTERNATIONAL BUSINESS MACHINES CORPORATION, Armonk, NY (US)

(72) Inventors: Yehonatan Bitton, Beer Sheva (IL); Andrey Finkelshtein, Beer Sheva (IL); Eitan Menahem, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 16/908,785

(22) Filed: Jun. 23, 2020

(65) Prior Publication Data

US 2021/0400064 A1    Dec. 23, 2021

(51) Int. Cl.
*H04L 9/40* (2022.01)
*G06F 21/55* (2013.01)

(52) U.S. Cl.
CPC ...... *H04L 63/1425* (2013.01); *H04L 63/1441* (2013.01)

(58) Field of Classification Search
CPC ............. H04L 63/1425; H04L 63/1441; H04L 63/1416; H04L 63/1408; H04L 63/1433; H04L 47/2441; G06F 21/577
See application file for complete search history.

(56) References Cited

U.S. PATENT DOCUMENTS

| | | | |
|---|---|---|---|
| 6,671,711 B1 | 12/2003 | Pirolli | |
| 7,043,702 B2 | 5/2006 | Chi | |
| 7,680,858 B2 | 3/2010 | Poola | |
| 7,769,682 B2 | 8/2010 | Moudgal | |
| 8,634,297 B2 | 1/2014 | Mishra | |
| 10,931,686 B1* | 2/2021 | Mehta | H04L 63/1416 |
| 2002/0130907 A1* | 9/2002 | Chi | G06F 16/954 715/853 |
| 2007/0198603 A1 | 8/2007 | Tsioutsiouliklis | |
| 2008/0010291 A1 | 1/2008 | Poola | |
| 2008/0275902 A1 | 11/2008 | Burges | |
| 2010/0094768 A1 | 4/2010 | Miltonberger | |
| 2014/0189829 A1* | 7/2014 | McLachlan | G06Q 20/4014 726/6 |
| 2014/0278479 A1 | 9/2014 | Wang | |
| 2015/0161622 A1 | 6/2015 | Hoffmann | |

(Continued)

FOREIGN PATENT DOCUMENTS

WO    2003052571 A1    6/2003

OTHER PUBLICATIONS

More et al., "Dynamic malware detection and recording using virtual machine introspection," DSCI—Best Practices Meet 2013 Year: 2013 | Conference Paper | Publisher: IEEE.*

(Continued)

*Primary Examiner* — Roderick Tolentino
(74) *Attorney, Agent, or Firm* — Steven M. Bouknight

(57) ABSTRACT

A cyber security method including: obtaining user flow data associated with a browsing session at a website; constructing a directed graph representative of the browsing session; computing a set of features for the directed graph; and applying a machine learning classifier to the set of features, to classify the browsing session as legitimate or fraudulent.

18 Claims, 5 Drawing Sheets

(56) References Cited

U.S. PATENT DOCUMENTS

| | | | |
|---|---|---|---|
| 2016/0011732 A1* | 1/2016 | Yang | H04L 67/01 |
| | | | 715/763 |
| 2016/0307201 A1 | 10/2016 | Turgeman | |
| 2017/0085587 A1* | 3/2017 | Turgeman | G06F 21/32 |
| 2018/0139104 A1* | 5/2018 | Seddigh | H04L 41/12 |
| 2018/0210864 A1 | 7/2018 | Zhang | |
| 2018/0295148 A1* | 10/2018 | Mayorgo | H04L 63/20 |
| 2019/0205932 A1* | 7/2019 | Ericson | G06Q 20/0658 |
| 2020/0137092 A1* | 4/2020 | Yan | G06F 21/566 |
| 2021/0264003 A1* | 8/2021 | Solano | G06N 5/003 |

OTHER PUBLICATIONS

Mekky et al., "Separation of benign and malicious network events for accurate malware family classification," 2015 IEEE Conference on Communications and Network Security (CNS) Year: 2015 | Conference Paper | Publisher: IEEE.*

IBM, List of IBM Patents or Patent Applications Treated as Related, Appendix P, dated Jul. 17, 2020, 2 pages.

Pending U.S. Appl. No. 16/908,789, filed Jun. 23, 2020, entitled: "Clustering Web Page Addresses for Website Analysis", pp. 1-42.

Chau et al., "Detecting Fraudulent Personalities in Networks of Online Auctioneers," Proceedings of the 10th European Conference on Principles and Practice of Knowledge Discovery in Databases Berlin, Germany, Springer-Verlag Berlin Heidelberg, http://www.cs.cmu.edu/~dchau/papers/auction_fraud_pkdd06.pdf, Sep. 18-22, 2006, pp. 103-114.

Dalvi, et al., "A Method of Performing Structural Clustering of Web Pages," IP.Com Prior Art Database Technical Disclosure, IP.Com No. IPCOM000206554D, https://priorart.ip.eom/IPCOM/000253348, Apr. 29, 2011, pp. 1-6.

Disclosed Anonymously, "Phishing Kits Detection," IP.Com Prior Art Database Technical Disclosure, IP.Com No. IPCOM000253348D, https://priorart.ip.com/IPCOM/000253348, Mar. 23, 2018, pp. 1-4.

Kan, et al., "Fast webpage classification using URL features,"ACM 1-59593-140-6/05/0010, https://dl.acm.org/doi/10.1145/1099554.1099649, Nov. 5, 2005, pp. 1-2.

Koppula, et al., "Learning URL Patterns for Webpage De-duplication," ACM 978-1-60558-889—Jun. 10, 2002, https://dl.acm.org/doi/10.1145/1718487.1718535, Feb. 6, 2010, pp. 1-10.

Le, et al., "URLNet: Learning a URL Representation with Deep Learning for Malicious URL Detection," arXiv:1802.03162v2, https://www.researchgate.net/publication/323118482, Mar. 2, 2018, pp. 1-13.

* cited by examiner

USER FLOW GRAPH ANALYTICS FOR CYBER SECURITY

BACKGROUND

The invention generally relates to the filed of computing, and more particularly, to the field of cyber security.

Many organizations allow clients to access their accounts with the organization through secure websites. This includes, for example, financial institutions such as banks, brokers, and insurers, as well as e-commerce companies or other organizations serving clients.

Such organizations suffer from frequent frauds, causing tremendous damage to the organization and its clients alike. One common type of fraud is known as Account Take-Over (ATO), where a malicious agent gains unauthorized access the online account of a user, such as by compromising the logon credentials of that user. Malicious agents can change account details, make purchases, withdraw funds, and gain sensitive and confidential information of the user, for example.

Organization employ a variety of cyber security measures to prevent or discover fraudulent activity conducted through their websites. For example, preemptive measures include enforcing strong-password policies, periodic password change policies, two-factor authentication, biometric authentication, etc. To discover frauds in real-time, organizations often rely on 'red flags' such as atypical geographic location of the user (as evident from his or her IP address), atypical behaviometrics (e.g., atypical cursor or keystroke dynamics), or atypical transactions, to name a few examples.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method comprising operating at least one hardware processor to, automatically: (a) obtain user flow data associated with a browsing session at a website; (b) construct a directed graph representative of the browsing session; (c) compute a set of features for the directed graph; and (d) apply a machine learning classifier to the set of features, to classify the browsing session as legitimate or fraudulent.

Another embodiment relates to a system comprising: at least one hardware processor; and a non-transitory computer-readable storage medium having program code embodied therewith, the program code executable by said at least one hardware processor to: (a) obtain user flow data associated with a browsing session at a website, (b) construct a directed graph representative of the browsing session, (c) compute a set of features for the directed graph, and (d) apply a machine learning classifier to the set of features, to classify the browsing session as legitimate or fraudulent.

A further embodiment relates to a computer program product comprising a non-transitory computer-readable storage medium having program code embodied therewith, the program code executable by at least one hardware processor to: (a) obtain user flow data associated with a browsing session at a website, (b) construct a directed graph representative of the browsing session, (c) compute a set of features for the directed graph, and (d) apply a machine learning classifier to the set of features, to classify the browsing session as legitimate or fraudulent.

In some embodiments, the method further comprises, or the program code is further executable for, prior to step (a): Generating a training set by: obtaining user flow data associated with multiple browsing sessions of multiple users at the website, wherein some of the multiple browsing sessions are labeled as legitimate, and a remainder of the multiple browsing sessions are labeled as fraudulent; for each of the multiple browsing sessions, automatically constructing a directed graph representative of the respective browsing session; for each of the multiple directed graphs, automatically computing a set of features; and defining the training set as comprising the computed sets of features and the labels, wherein each of the computed sets of features is associated with one of the labels. Training the machine learning classifier based on the training set.

In some embodiments, said generation of the training set further comprises: automatically constructing a legitimate global directed graph representative of those of the multiple browsing sessions labeled as legitimate; automatically computing a set of features characterizing differences between the legitimate global directed graph and each of the multiple directed graphs of the browsing sessions that are labeled as legitimate; automatically constructing a fraudulent global directed graph representative of those of the multiple browsing sessions labeled as fraudulent; and automatically computing a set of features characterizing differences between the fraudulent global directed graph and each of the multiple directed graphs of the browsing sessions that are labeled as fraudulent, wherein the training is further defined as comprising the computed sets of features that characterize the differences.

In some embodiments, the user flow data of step (a), and the user flow data of the training set, each separately comprise multiple ones of the following transition: a URL (Uniform Resource Locator) of a referrer page at the website, a URL of a target page at the website, and time spent on the target page.

In some embodiments, said construction of the directed graph, separately in step (b) and in said generation of the training set, comprises: defining the referrer and target pages as vertices of the directed graph; defining the traversals from the referrer pages to the target pages as edges of the directed graph; merging those of the transitions whose referrer pages are identical and whose target pages are identical; defining, as a weight attribute of each of the edges, a sum of the time spent on the respective target page over all transitions that comprise the respective target page; and defining, as an attribute of each of the vertices, a list of one or more of the sums that are attributed to one or more of the edges, respectively, pointing at the respective vertex.

In some embodiments, the method further comprises, or the program code is further executable for, responsive to classification of the browsing session as fraudulent in step (d): automatically terminating the browsing session and suspending a user account associated with the browsing session In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A technique for detection of fraudulent user activity at a website is disclosed herein. The technique may be embodied in a system, a method, and a computer program product. A user browsing session at the website is tracked, to obtain user flow data associated with the session. The user flow data is descriptive of the browsing path taken by the user at the website: which pages were visited, in what order, and for what duration. Then, a directed graph representative of the session is constructed from the user flow data, and a set of features of this directed graph is computed. Finally, a machine learning classifier is applied to the set of features, in order to classify the session as legitimate or fraudulent.

Advantageously, the machine learning classifier is trained to differentiate between graph feature values that are typically associated with browsing activity of legitimate users, and graph feature values typically associated with browsing activity of fraudulent users. This is based on the notion that the way a typical fraudulent user browses a certain website is different, even if minimally, than how a typical legitimate user browses it. The graph features can capture even minute differences, and lead to effective detection of a fraudulent browsing session—optionally in real-time.

The disclosed technique is useful, for example, in the context of financial institution websites which serve as gateways to access client accounts. When the account credentials of a legitimate user are compromised, a fraudulent user may access the account through the website and conduct illegitimate activities—such as wire money out of the account, make online purchases, change account details, or access sensitive information about the client, to name a few examples. The malicious intent of such fraudulent user may be subtly expressed by the way he or she conduct their browsing session, and hence be detectable by the present technique.

Similarly, the present technique may be beneficial for any type of website which maintains user accounts (not "accounts" in the financial sense, but rather personal access of the website) and requires users to authenticate before accessing their accounts.

Accordingly, the term "website," as used herein, may refer to any type of web application having its front end as a set of HTML (HyperText Markup Language) documents ("pages"), and its back end as one or more databases that store data associated with user accounts—wherein reading and writing of such data is only permitted to authenticated users.

In a more general sense, the technique can be utilized with any computerized system that can track the actions of individual users therein, and provide user flow data descriptive of these actions.

Figure 1:
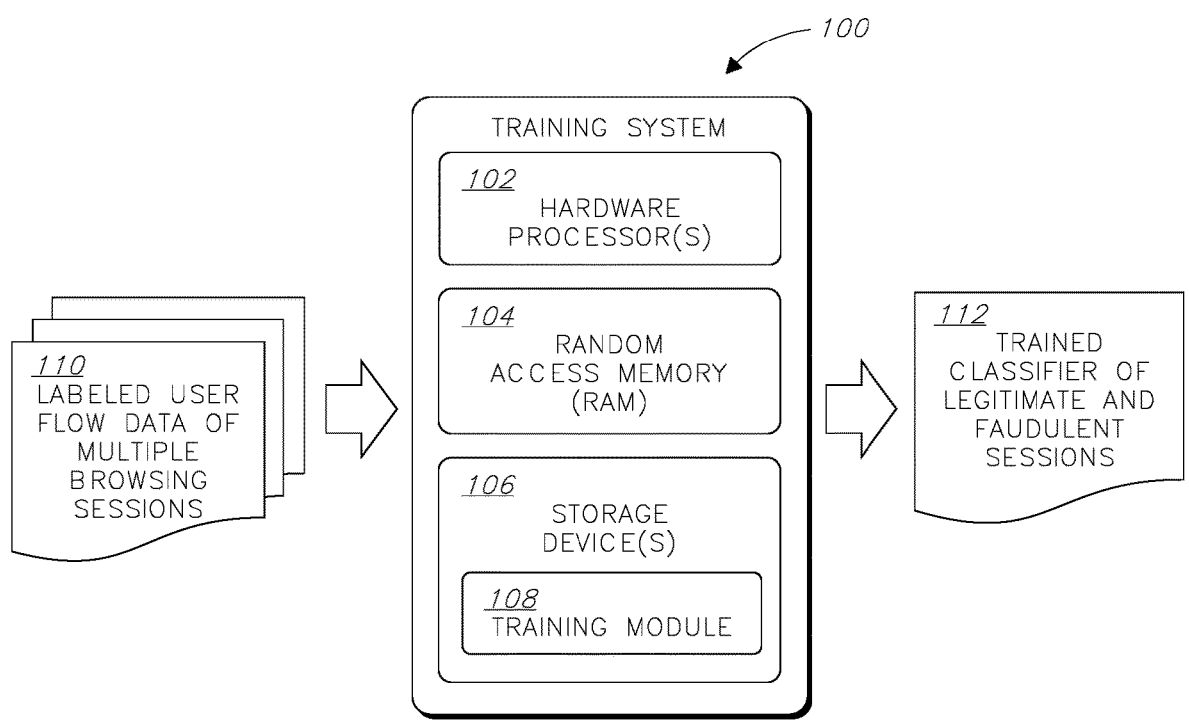
FIG. 1 is a block diagram of an exemplary system for training a machine learning classifier, according to an embodiment.

Reference is now made to FIG. 1, which shows a block diagram of an exemplary system 100 for training a machine learning classifier (hereinafter simply "classifier"), according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a training module 108. The software components may include an operating system having various software components and/or drivers for controlling and managing general system tasks (e.g., memory management, storage device control, power management, etc.), and facilitating communication between various hardware and software components.

System 100 may operate by loading instructions of training module 108 into RAM 104 as they are being executed by processor(s) 102. The instructions of training module 108 may cause system 100 to receive labeled user flow data of multiple browsing sessions of multiple users 110, process that data, and output a trained classifier of legitimate and fraudulent sessions 112.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system could run as one or more cloud computing "instances," "containers," and/or "virtual machines," as known in the art.

The instructions of training module 108 are now discussed with reference to the flowchart of FIG. 2, which illustrates a method for training a classifier of legitimate and fraudulent sessions, in accordance with an embodiment.

Figure 2:
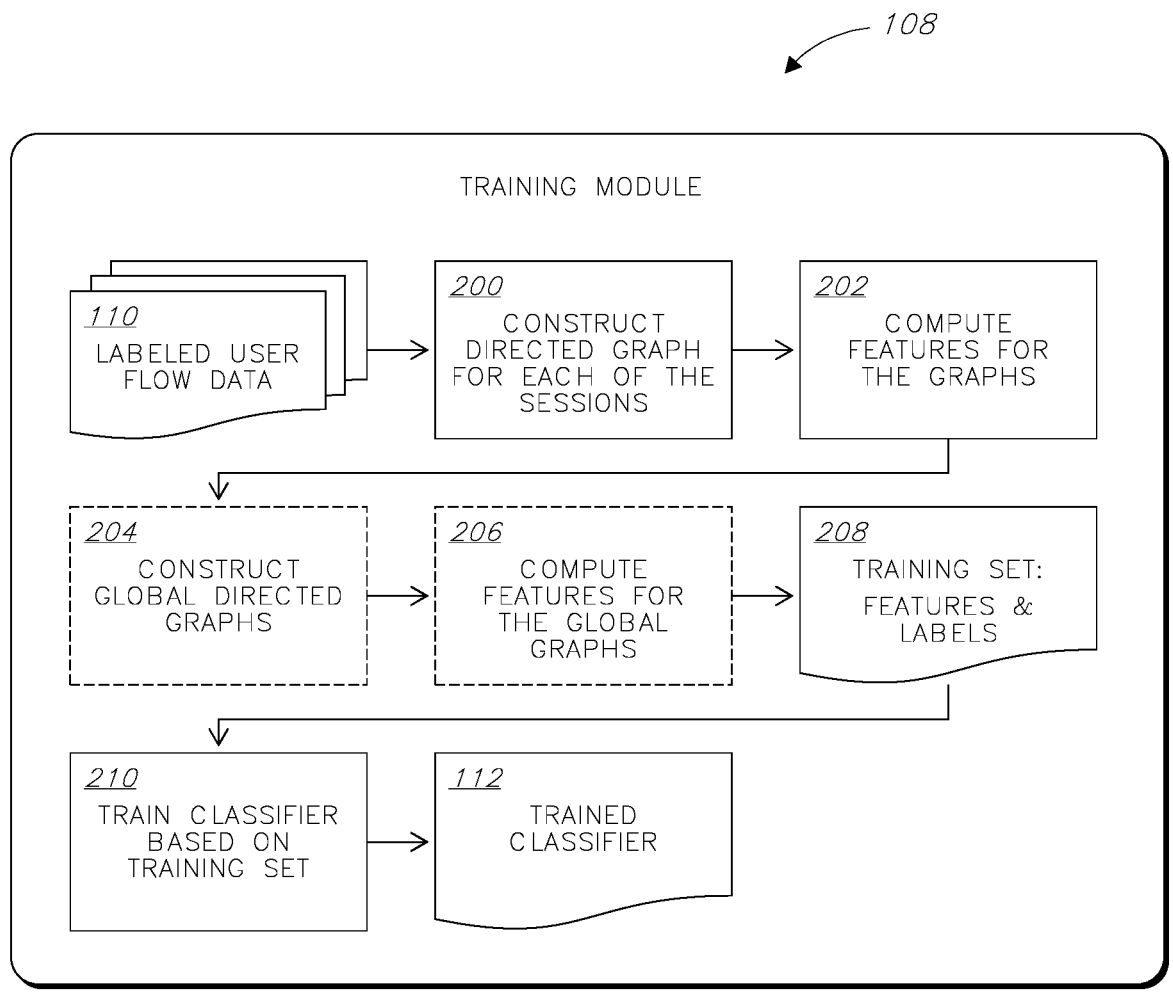
FIG. 2 is a flowchart of a method for training a machine learning classifier of legitimate and fraudulent sessions, according to an embodiment.

Steps of the method of FIG. 2 may either be performed in the order they are presented or in a different order (or even in parallel), as long as the order allows for a necessary input to a certain step to be obtained from an output of an earlier step. In addition, the steps of that method are performed automatically (e.g., by system 100 of FIG. 1), unless specifically stated otherwise.

First, labeled user flow data 110 (of FIG. 1) are obtained, for example, by extracting information from one or more log files of an HTTP (HyperText Transfer Protocol) server hosting a particular website, representing that information as user flow data, and labeling each browsing session in the user flow data as legitimate or fraudulent.

User flow data 110 may be associated with a sufficient number of browsing sessions of different users, to form a large enough sample for training the classifier effectively.

For example, user flow data 110 may be associated with at least 50, 100, 200, or more sessions labeled as legitimate, and a similar number of sessions labeled as fraudulent. Each session is associated with a single user, and one user may have one or more sessions associated with him or her. The labeling may be performed based on verified information of whether each session was legitimate (i.e., conducted by the real user who authenticated his/herself at the start of the session) or fraudulent (i.e., conducted by a malicious user who illegitimately authenticated his/herself as the real user, such as by gaining access to the credentials of the real user).

For each session, the information extracted from the log file may be represented as a series of transitions each structured as the tuple—

{(referrer page URL, target page URL, time on target page)}.

The referrer page URL (Uniform Resource Locator) is the source of each transition, and is typically an HTML document including a hyperlink to the target page, or automatically redirecting the user's web browser to the target page. As the user clicks that hyperlink, or as the web browser automatically redirects to the target page, the web browser retrieves the target page and renders it. When the user clicks a hyperlink in the target page (now having the role of a source page), or when another automatic redirect is performed, the web browser retrieves and renders a new target page, and so on. The time spent on the target page (also "time on page," or "TOP") can be calculated as the time between retrieval of the target page and retrieval of a subsequent, new target page.

Consider, for example, the following exemplary user flow data of a particular session of a user at a banking website:

Logon>Logon (5)
Logon>MyAccounts (350)
MyAccounts>ViewTransactions (35)
ViewTransactions>ManageOverdraft (115)

The user spent 5 seconds at the Logon page, then 350 seconds at the MyAccounts page, 35 seconds at the ViewTransactions page, and 115 seconds at the ManageOverdraft page.

The referrer and target pages are not necessarily "pages" in the sense of discrete HTML documents that are retrieved using HTTP GET requests; for example, a page may be defined as an HTTP POST request that transmits certain information to the HTTP server (e.g., submission of a form with details of a requested wire transfer), without the HTTP server transmitting a new HTML document in response. Rather, the HTTP server may just transmit a message that is rendered and displayed to the user inside a previously-rendered HTML document. For example, this may be conducted using the known AJAX technique, which enables sending and retrieving data from a server asynchronously, without interfering with the display and behavior of the existing HTML page.

Next, in step 200, a directed graph for each of the sessions, which is representative of the respective session, may be constructed:

Generally, to construct the directed graph, pages of the transitions are defined as its vertices, and traversals from referrer pages to target pages are defined as the graph's edges.

Figure 5:
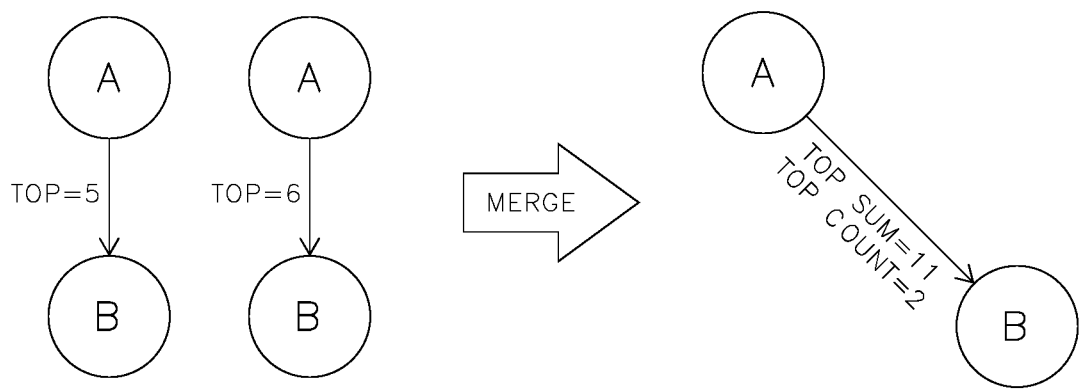
FIG. 5 illustrates exemplary merging of transitions of a directed graph, according to an embodiment.

In a pre-processing stage, those of the transitions whose referrer pages are identical and whose target pages are identical, may be merged. Interim reference is made to FIG. 5, which shows such exemplary merging. On the left are illustrated: First, a transition from page A to page B with a TOP of 5 seconds (namely, time on page B), represented by two vertices. A and B and a directed edge from A to B with an attribute TOP=5. Second, another transition from page A to page B with a TOP of 6 seconds, represented by two vertices A and B and a directed edge from A to B with an attribute TOP=6. These two transitions are merged into two vertices A and B, and a directed edge from A to B with the attributes TOP sum=11 and TOP count=2.

Following that pre-processing, the directed graph may be constructed as a weighed graph G=(V,E,W). The vertices (V) of the graph (G) are the union of the referrer pages and the target pages (note that some of the referrer and target pages are actually the same page with different roles assumed in different transitions):

$V_{referrers}$:={all pages that were referrers}

$V_{targets}$:={all pages that were targets}

$V:=V_{referrers} \cup V_{targets}$.

The edges (E) may be defined as follows, with the following attributes:

$E=\{(u,v,\text{TOP sum,TOP count}) \in \text{Counted Transitions}\}$, where u is the tail vertex and v is the head vertex.

The weight (W) attribute of each of the edges of the graph may be defined as the total time on a page during the session:

$W(u,v)$=TOP sum.

Each of the vertices (V) may have two attributes: a page identifier (such as the page's URL), and list of the TOPs from the incoming neighbors:

$\forall i \in V, v_{incoming\ TOP}$:=[TOP sum from the neighbors of $v$].

Figure 6:
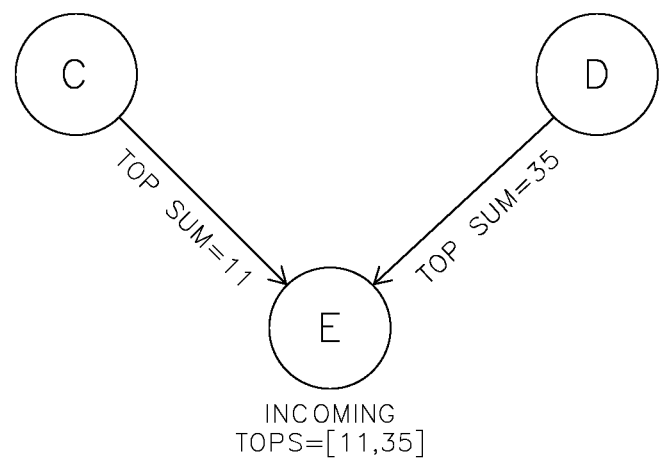
FIG. 6 illustrates an exemplary directed graph, constructed according to an embodiment.

Interim reference is made to FIG. 6, which shows an exemplary graph with: three vertices C, D, and E; an incoming TOP sum from C to E of 11; and an incoming TOP sum from D to E of 35. Vertex E is therefore attributed with the following list of incoming TOPs from its neighbors: [11, 35].

It should be noted that the construction of the directed graph in step 200 does not have to include any visual rendering of such graph; rather, the directed graph may be constructed textually, using computer-readable syntax suitable for graph representation, as known in the art.

In step 202, a set of features for each of the directed graphs constructed in step 200 may be computed (also "extracted"). These features will later serve in a training set for the classifier.

For example, some or all of the following features may be computed for each of the directed graphs constructed in step 200:

The incoming TOPs attribute of each vertex, as calculated in step 200.

One or more statistical measures of these incoming TOP attributes, computed per page and/or per session, such as: mean/median/maximal/minimal TOP, standard deviation of TOP, and/or any other computable statistical measure of the TOP lists.

A graph connectivity measure, as known in the art.

One or more statistical measures of clusters produced by performing vertex clustering, as known in the art, of the vertices of the graph: Number of clusters, mean/median/maximal/minimal cluster size, standard deviation of cluster size, and/or any other computable statistical measure of the clusters.

One or more vertex centrality measures, as known in the art, of the graph. For example, degree, betweenness, closeness, and/or any other computable centrality measure.

One or more graph features such as its density, clustering coefficient, diameter, transitivity, centrality statistics, as known in the art, and/or any other computable topological characteristic of the graph.

In addition, one or more of the following features of each browsing session may be computed:

Time of day when the logon that initiated the session occurred.

Day of the week when the logon that initiated the session occurred.

Statistics as to different categories (e.g., transactions view, account information, credit cards, wire transfers, savings, securities trading, etc.) to which the pages belong: number of visits to pages of each category, total/mean/median/minimal/maximal TOP for each category, standard deviation of TOP in each category, and/or any other computable statistical measure of the categories.

In step 204, which is optional, global directed graphs may be constructed—one representative of all legitimate sessions, and another representative of all fraudulent sessions. Each of these global directed graphs may be constructed by performing a graph union operation, as known in the art, on all the directed graphs constructed in step 200 (referred to herein, to prevent confusion with the global directed graphs, as "local directed graphs") for the sessions labeled as legitimate or fraudulent, respectively. Accordingly, each of the two global directed graphs essentially combines (e.g., using a mean, a median, a sum, etc.) the values of the attributes of all its respective (legitimate or fraudulent) local directed graphs, as well as combines the weights of the edges.

In step 206, which is optional and accompanies step 204, multiple sets of features may be computed (also "extracted"), each such set characterizing various differences between one of the global directed graphs (legitimate or fraudulent) and each of the local directed graphs which served as the basis for construction of that global directed graph. For example, if there are one hundred local directed graphs associated with legitimate sessions, and one hundred local directed graphs associated with fraudulent sessions, then two hundred sets of features are computed in step 206.

One option to compute these sets of features is to calculate the distance between attribute values of corresponding vertices and edges of each local directed graph and its associated (legitimate or fraudulent) global directed graph. Namely, the values of the attributes of each of the local directed graphs are subtracted from the values of corresponding attributes of the associated global directed graph, and the absolute values of results are saved as the features. Merely as an example, if an incoming TOP attribute of vertex E in a certain legitimate global directed graph is [6,61], and an incoming TOP attribute of vertex E of a certain local directed legitimate graph is [11,35] (as in FIG. 6), then an incoming TOP feature for step 206 is computed as [16-111, 161-351], equaling [5,26]; this feature characterizes the absolute incoming TOP difference between that certain local legitimate directed graph and the certain global legitimate directed graph.

A variant of that option is to compute, in a similar manner to step 202 above, a set of features for each of the global directed graphs, and to then calculate the distance between the values of these features and values of corresponding features in each of the associated (legitimate or fraudulent) local directed graphs. For example, if one of the features computed per step 202 is the vertex centrality measure of "betweenness," then the distance between betweenness values of corresponding vertices in each of the global directed graphs and each of its associated local directed graphs may be used as a feature of step 206.

A second option to compute these sets of features is to calculate the ratio between attribute values of corresponding vertices and edges of each local directed graph and its associated (legitimate or fraudulent) global directed graph. Following the previous example (incoming TOP attribute of [6,61] in a global directed graph, and [11,35] in a local directed graph), an incoming TOP feature is computed as [6/11, 61/35], equaling approximately [0.54, 1.74]; this feature of step 206 characterizes the ratio between the incoming TOP attributes of those certain local legitimate directed graph and global legitimate directed graph.

A variant of the second option, similar to the variant of the first option, is to calculate a ratio between corresponding feature values (computed per the technique of step 202) of each local directed graph and its associated (legitimate or fraudulent) global directed graph.

A third option to compute these sets of features is to calculate a similarity, using metrics such as edit distance, Jaccard index, or the like, between selected vertex and edge groups in each local directed graph and its associated (legitimate or fraudulent) global directed graph. First, the vertices and/or edges of each of the two graphs may be ranked, for example based on the values of their attributes, their weights, and/or any other ranking criteria. Then, a group of the top N (e.g., a number between 3-30) ranking vertices and/or edges from each graph is selected, and the similarity metric (e.g., edit distance, Jaccard index) between the two is calculated.

Features computed according to one or more of the above options may be included in the sets of features of step 206.

As step 202, and optionally also step 206, conclude, they yield a training set 208 which may include a matrix of N sessions over M features, as well as a vector of the size of N with the label (legitimate/fraudulent) of each session. Any other representation of the training set is also possible, as long as it includes that information of the sessions, the computed features, and the labels.

Then, in step 210, a classifier is trained based on training set 208. The classifier may be, for example, logistic regression, naive Bayes, a nearest neighbor classifier, a Support Vector Machine (SVM) classifier, a decision tree classifier, a boosted tree classifier, a random forest classifier, a neural network classifier, or any other type of machine learning classifier. The training of the classifier may be conducted using any conventional method suitable for that type of classifier.

Following the training, trained classifier 112 (of FIG. 1) is provided. That trained classifier is configured, when applied to a browsing session in question, to infer a classification of that session as legitimate or fraudulent.

The training and inference are optionally conducted in association with the same website, for example a website of a specific bank. This way, the classifier is tasked with processing the same type of data (the same underlying pages) as the data it was trained upon.

Alternatively, it is possible to perform the training based not on specific page URLs but rather on more generic page identifiers that are typical to a certain website type. For example, many different banking websites include more or less the same types of pages which are presented to logged-on users, because banks typically allow their clients to perform similar actions online. By creating rules that automatically map a page (e.g., by parsing its contents) to a generic identifier, the training may be generic enough so that the resulting classifier can operate with any other website of the same time (provided that, prior to inference, the user flow data of the browsing session in question is mapped to the same generic identifiers based on the same rules).

Figure 3:
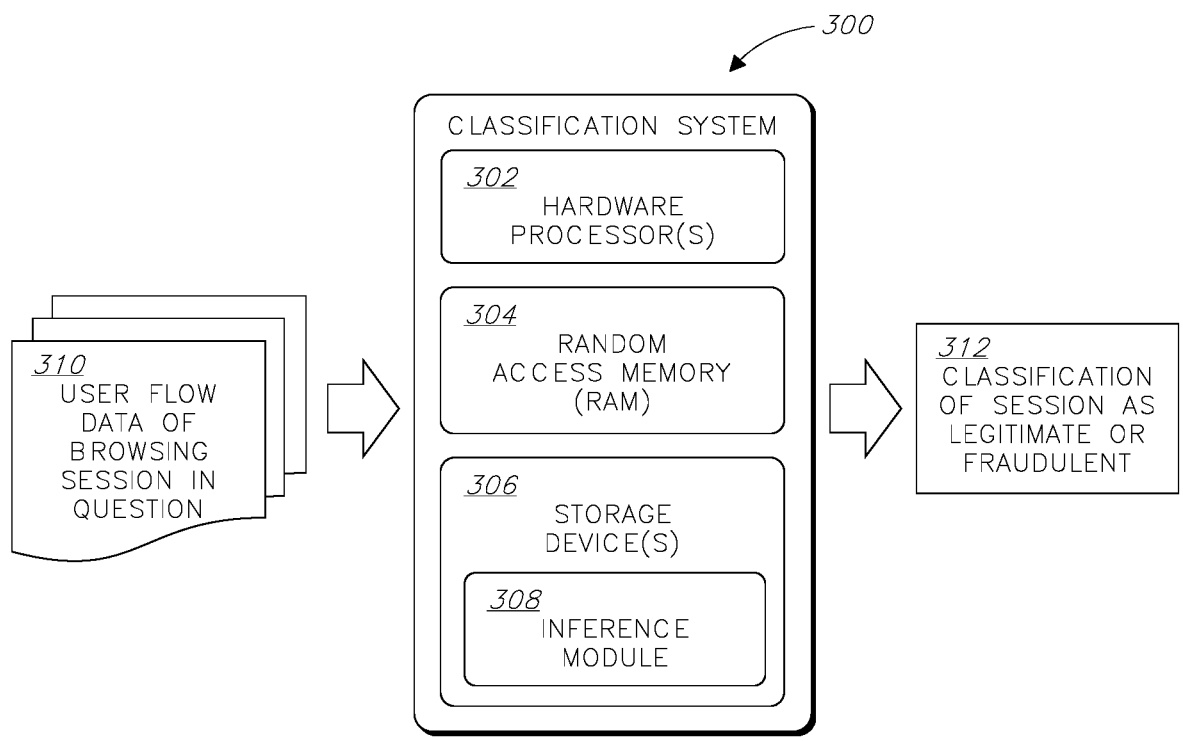
FIG. 3 is a block diagram of an exemplary system for classifying sessions in-question as legitimate or fraudulent, according to an embodiment.

Reference is now made to FIG. 3, which shows a block diagram of an exemplary system 300 for classifying sessions in-question as legitimate or fraudulent, according to an embodiment. System 300 may be similar to system 100 of FIG. 1, and include at least some of the same components, shown here with reference numbers larger by 200 than those of FIG. 1 (e.g., the hardware processor(s) as 302 instead of 102, etc.); the description of these components and of the entire system is not repeated here, for reasons of brevity.

That said, system 300 includes an inference module 308 instead of a training module. The instructions of inference module 308 may cause system 300 to receive user flow data of a browsing session in question 310, process that data, and infer a classification 312 of the session in question as legitimate or fraudulent.

The instructions of inference module 308 are now discussed with reference to the flowchart of FIG. 4, which illustrates a method for classifying a session in question as legitimate or fraudulent, in accordance with an embodiment.

Figure 4:
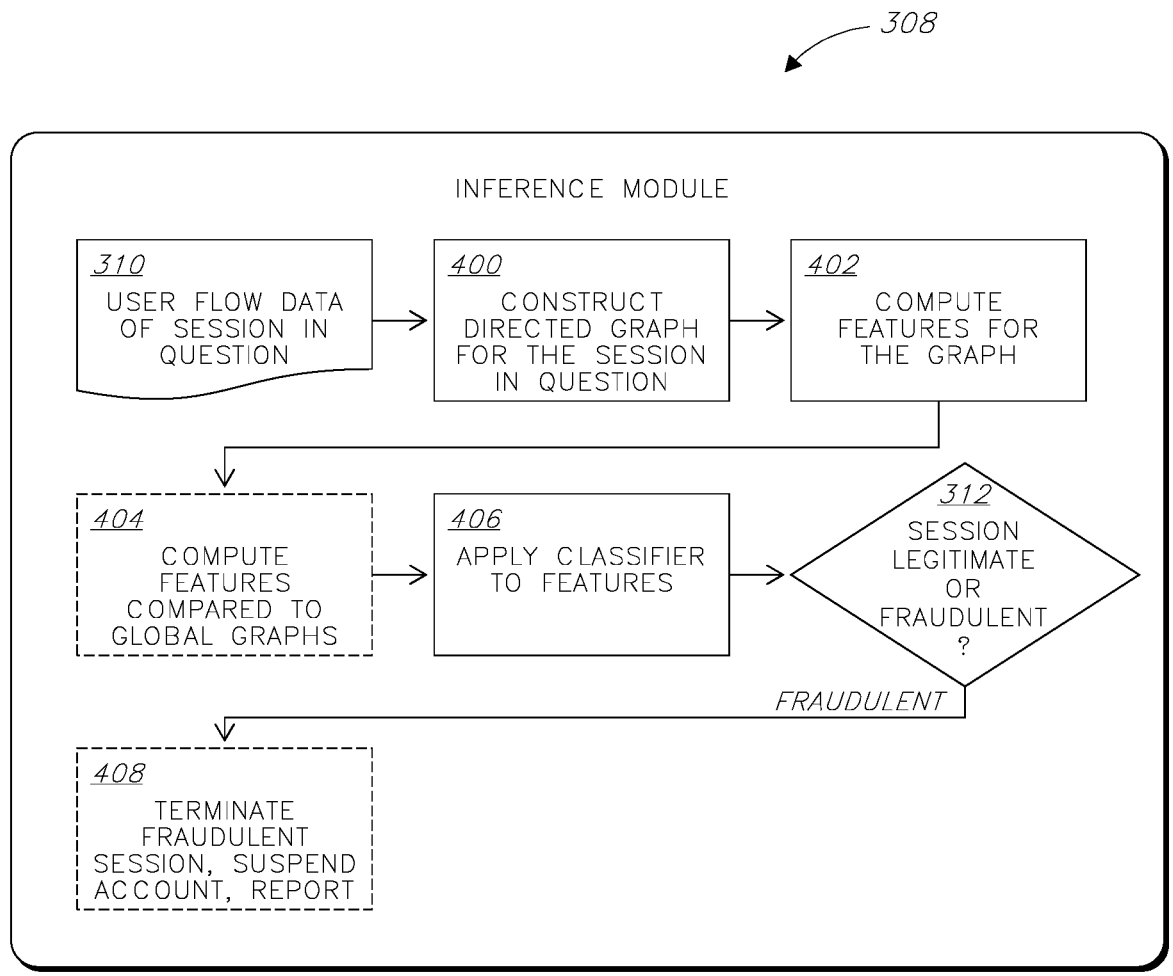
FIG. 4 is a flowchart of a method for classifying a session in-question as legitimate or fraudulent, according to an embodiment.

Steps of the method of FIG. 4 may either be performed in the order they are presented or in a different order (or even in parallel), as long as the order allows for a necessary input to a certain step to be obtained from an output of an earlier step. In addition, the steps of that method are performed automatically (e.g., by system 300 of FIG. 3), unless specifically stated otherwise.

First, user flow data of the browsing session in question 310 (of FIG. 3) are obtained, for example in the same manner described above for obtaining the user flow data for the training.

In step 400, based on user flow data 310, a directed graph representative of the session in question may be constructed. Its construction may be similar to the way each of the directed graphs were constructed for the training, in step 200 of FIG. 2.

In step 402, a set of features for the directed graph constructed in step 400 may be computed (also "extracted"). Their computation may be similar to the way the set of features were computed for the directed graphs of the training, in step 202 of FIG. 4.

The set of features computed in step 402 may be represented in a vector of M features, sorted similarly to their order in the training set (or otherwise identified in a manner allowing the classifier to correctly correlate them). However, it is possible to compute less features for the directed graph of the session in question than the number of features the classifier has been trained upon.

Step 404, which is optional, includes computation of a set of features which characterizes differences between the directed graph constructed for the session in question and the legitimate global directed graph (of step 204, FIG. 2), and another set of features which characterizes differences between the directed graph constructed for the session in question and the fraudulent global directed graph (of step 204, FIG. 2).

Notably, steps 200 (FIG. 2) and 400 (FIG. 4) may separately use the same underlying technique, mutatis mutandis, to construct their directed graphs; steps 202 (FIG. 2) and 402 (FIG. 4) may separately use the same underlying technique, mutatis mutandis, to compute features for their directed graphs; and steps 206 (FIG. 2) and 404 (FIG. 4) may separately use the same underlying technique, mutatis mutandis, to compute the features characterizing differences between a local directed graph (or the directed graph of the session in question) and a global directed graph.

In step 406, the classifier may be applied to the features computed in step 402 (and optionally also those computed in step 404), in order to infer a classification of the session in question as legitimate or fraudulent 312 (also of FIG. 3). Block 312 may also serve as a decision block, triggering further action if the session in question has been classified as fraudulent. For example, in step 408, a fraudulent browsing session may be terminated to prevent additional damage, and/or be reported to responsible personnel who can take actions to mitigate the fraudulent activity either in real time or after the fact.

To allow termination of fraudulent sessions as in step 408, it may be beneficial to execute the method of FIG. 4 in real-time, for every active session at the website (or only for active sessions flagged as suspicious by some other preliminary algorithm). Every such session may be tracked in real-time as it progresses, so as to periodically update its user flow data, associated directed graph, and computed features—such as every predetermined number of seconds or every predetermined number of transitions (for example, after each and every transition). After each update, the classifier may be applied to the newly-computed features. If at any point in time the classifier infers a fraudulent classification, the session may be immediately terminated by interfacing with the HTTP server of the website and causing it to log that user out and optionally to also suspend the affected account. A report to responsible personnel may be concurrently transmitted. The suspension of the affected account may also include causing the HTTP server to display a message to anyone who subsequently tries to logon to it that he or she must contact responsible personnel (e.g., a referee at the bank) in order to verify their identity and possibly issue them with new logon credentials.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting fraud associated with a browsing session comprising operating at least one hardware processor to automatically:
    obtain user flow data associated with the browsing session at a website based on information extracted from a server hosting the website;
    construct a directed graph representative of the browsing session associated with the user data flow, wherein said construction of the directed graph representative of the browsing session further comprises,
        defining referrer pages and target pages as vertices of the directed graph;
        defining traversals from the referrer pages to the target pages as edges of the directed graph;
        merging transitions whose referrer pages are identical and whose target pages are identical;

defining, as a weight attribute of each of the edges, a sum of time spent on a respective target page over all transitions that comprise the respective target page; and defining, as an attribute of each of the vertices, a list of one or more of the sums that are attributed to one or more of the edges, respectively, pointing at a respective vertex;

compute a set of graph feature values for the directed graph; and based on the computed set of graph feature values, determine whether the browsing session is legitimate or fraudulent by applying a machine learning classifier to the computed set of graph feature values, wherein the machine learning classifier is trained to differentiate between graph feature values associated with browsing activity of legitimate users and the graph feature values associated with the browsing activity of fraudulent users.

2. The method of claim 1, further comprising, prior to obtaining the user flow data associated with the browsing session at the website:

generating a training set by:

obtaining the user flow data associated with multiple browsing sessions of multiple users at the web site, wherein some of the multiple browsing sessions are labeled as legitimate, and a remainder of the multiple browsing sessions are labeled as fraudulent, for each of the multiple browsing sessions, automatically constructing a directed graph representative of the respective browsing session, for each of the multiple directed graphs, automatically computing the set of graph feature values, and defining the training set as comprising the computed sets of graph feature values and the labels, wherein each of the computed sets of graph feature values is associated with one of the labels; and training the machine learning classifier based on the training set.

3. The method of claim 2, wherein said generation of the training set further comprises:

automatically constructing a legitimate global directed graph representative of those of the multiple browsing sessions labeled as legitimate;

automatically computing the set of graph feature values characterizing differences between the legitimate global directed graph and each of the multiple directed graphs of the browsing sessions that are labeled as legitimate;

automatically constructing a fraudulent global directed graph representative of those of the multiple browsing sessions labeled as fraudulent; and automatically computing the set of graph feature values characterizing differences between the fraudulent global directed graph and each of the multiple directed graphs of the browsing sessions that are labeled as fraudulent, wherein the training set is further defined as comprising the computed sets of graph feature values that characterize the differences.

4. The method of claim 2, wherein the obtained user flow data associated with the browsing session at a website, and the user flow data of the training set, each separately comprise multiple ones of the following transition:

a URL (Uniform Resource Locator) of a referrer page at the website, a URL of a target page at the website, and the time spent on the target page.

5. The method of claim 4, wherein said construction of the directed graph in said generation of the training set further comprises:

defining the referrer pages and target pages as vertices of the directed graph;

defining the traversals from the referrer pages to the target pages as the edges of the directed graph;

merging the transitions whose referrer pages are identical and whose target pages are identical;

defining, as the weight attribute of each of the edges, the sum of the time spent on the respective target page over all transitions that comprise the respective target page; and defining, as the attribute of each of the vertices, the list of one or more of the sums that are attributed to one or more of the edges, respectively, pointing at the respective vertex.

6. The method of claim 1, further comprising, responsive to classification of the browsing session as fraudulent:

automatically terminating the browsing session and suspending a user account associated with the browsing session.

7. A system comprising:

at least one hardware processor; and a non-transitory computer-readable storage medium having program code embodied therewith, the program code executable by said at least one hardware processor to:

obtain user flow data associated with the browsing session at a website based on information extracted from a server hosting the website;

construct a directed graph representative of the browsing session associated with the user data flow, wherein said construction of the directed graph representative of the browsing session further comprises, defining referrer pages and target pages as vertices of the directed graph;

defining traversals from the referrer pages to the target pages as edges of the directed graph;

merging transitions whose referrer pages are identical and whose target pages are identical;

defining, as a weight attribute of each of the edges, a sum of time spent on a respective target page over all transitions that comprise the respective target page; and defining, as an attribute of each of the vertices, a list of one or more of the sums that are attributed to one or more of the edges, respectively, pointing at a respective vertex;

compute a set of graph feature values for the directed graph; and based on the computed set of graph feature values, determine whether the browsing session is legitimate or fraudulent by applying a machine learning classifier to the computed set of graph feature values, wherein the machine learning classifier is trained to differentiate between graph feature values associated with browsing activity of legitimate users and the graph feature values associated with the browsing activity of fraudulent users.

8. The system of claim 7, wherein the program code is further executable by said at least one hardware processor to prior to obtaining the user flow data associated with the browsing session at a website:
  generate a training set by:
    obtaining user flow data associated with multiple browsing sessions of multiple users at the website, wherein some of the multiple browsing sessions are labeled as legitimate, and a remainder of the multiple browsing sessions are labeled as fraudulent,
    for each of the multiple browsing sessions, automatically constructing a directed graph representative of the respective browsing session,
    for each of the multiple directed graphs, automatically computing the set of graph feature values, and
    defining the training set as comprising the computed sets of graph feature values and the labels, wherein each of the computed sets of graph feature values is associated with one of the labels; and
  train the machine learning classifier based on the training set.

9. The system of claim 8, wherein said generation of the training set further comprises:
  automatically constructing a legitimate global directed graph representative of those of the multiple browsing sessions labeled as legitimate;
  automatically computing the set of graph feature values characterizing differences between the legitimate global directed graph and each of the multiple directed graphs of the browsing sessions that are labeled as legitimate;
  automatically constructing a fraudulent global directed graph representative of those of the multiple browsing sessions labeled as fraudulent; and
  automatically computing the set of graph feature values characterizing differences between the fraudulent global directed graph and each of the multiple directed graphs of the browsing sessions that are labeled as fraudulent,
  wherein the training set is further defined as comprising the computed sets of graph feature values that characterize the differences.

10. The system of claim 8, wherein the obtained user flow data associated with the browsing session at a website and the user flow data of the training set, each separately comprise multiple ones of the following transition:
  a URL (Uniform Resource Locator) of a referrer page at the website,
  a URL of a target page at the website, and
  the time spent on the target page.

11. The system of claim 10, wherein said construction of the directed graph in said generation of the training set further comprises:
  defining the referrer pages and target pages as vertices of the directed graph;
  defining the traversals from the referrer pages to the target pages as the edges of the directed graph;
  merging the transitions whose referrer pages are identical and whose target pages are identical;
  defining, as the weight attribute of each of the edges, the sum of the time spent on the respective target page over all transitions that comprise the respective target page; and
  defining, as the attribute of each of the vertices, the list of one or more of the sums that are attributed to one or more of the edges, respectively, pointing at the respective vertex.

12. The system of claim 7, wherein the program code is further executable by said at least one hardware processor to responsive to classification of the browsing session as fraudulent:
  automatically terminate the browsing session and suspending a user account associated with the browsing session.

13. A computer program product comprising a non-transitory computer-readable storage medium having program code embodied therewith, the program code executable by at least one hardware processor to:
  obtain user flow data associated with the browsing session at a website based on information extracted from a server hosting the website;
  construct a directed graph representative of the browsing session associated with the user data flow, wherein said construction of the directed graph representative of the browsing session further comprises,
    defining referrer pages and target pages as vertices of the directed graph;
    defining traversals from the referrer pages to the target pages as edges of the directed graph;
    merging transitions whose referrer pages are identical and whose target pages are identical;
    defining, as a weight attribute of each of the edges, a sum of time spent on a respective target page over all transitions that comprise the respective target page; and
    defining, as an attribute of each of the vertices, a list of one or more of the sums that are attributed to one or more of the edges, respectively, pointing at a respective vertex;
  compute a set of graph feature values for the directed graph; and
  based on the computed set of graph feature values, determine whether the browsing session is legitimate or fraudulent by applying a machine learning classifier to the computed set of graph feature values, wherein the machine learning classifier is trained to differentiate between graph feature values associated with browsing activity of legitimate users and the graph feature values associated with the browsing activity of fraudulent users.

14. The computer program product of claim 13, wherein the program code is further executable by said at least one hardware processor to prior to obtaining user flow data associated with a browsing session at a website:
  generate a training set by:
    obtaining user flow data associated with multiple browsing sessions of multiple users at the website, wherein some of the multiple browsing sessions are labeled as legitimate, and a remainder of the multiple browsing sessions are labeled as fraudulent,
    for each of the multiple browsing sessions, automatically constructing a directed graph representative of the respective browsing session,
    for each of the multiple directed graphs, automatically computing the set of graph feature values, and
    defining the training set as comprising the computed sets of graph feature values and the labels, wherein each of the computed sets of graph feature values is associated with one of the labels; and
  train the machine learning classifier based on the training set.

15. The computer program product of claim 14, wherein said generation of the training set further comprises:
- automatically constructing a legitimate global directed graph representative of those of the multiple browsing sessions labeled as legitimate;
- automatically computing the set of graph feature values characterizing differences between the legitimate global directed graph and each of the multiple directed graphs of the browsing sessions that are labeled as legitimate;
- automatically constructing a fraudulent global directed graph representative of those of the multiple browsing sessions labeled as fraudulent; and
- automatically computing the set of graph feature values characterizing differences between the fraudulent global directed graph and each of the multiple directed graphs of the browsing sessions that are labeled as fraudulent,
- wherein the training set is further defined as comprising the computed sets of graph feature values that characterize the differences.

16. The computer program product of claim 14, wherein the obtained user flow data associated with a browsing session at a website, and the user flow data of the training set, each separately comprise multiple ones of the following transition:
- a URL (Uniform Resource Locator) of a referrer page at the website,
- a URL of a target page at the website, and
- the time spent on the target page.

17. The computer program product of claim 16, wherein said construction of the directed graph in said generation of the training set further comprises:
- defining the referrer pages and target pages as vertices of the directed graph;
- defining the traversals from the referrer pages to the target pages as the edges of the directed graph;
- merging the transitions whose referrer pages are identical and whose target pages are identical;
- defining, as the weight attribute of each of the edges, the sum of the time spent on the respective target page over all transitions that comprise the respective target page; and
- defining, as the attribute of each of the vertices, the list of one or more of the sums that are attributed to one or more of the edges, respectively, pointing at the respective vertex.

18. The computer program product of claim 13, wherein the program code is further executable by said at least one hardware processor to responsive to classification of the browsing session as fraudulent:
- automatically terminate the browsing session and suspending a user account associated with the browsing session.

* * * * *